United States Patent
Czachor et al.

(10) Patent No.: US 6,467,988 B1
(45) Date of Patent: Oct. 22, 2002

(54) REDUCING CRACKING ADJACENT SHELL FLANGE CONNECTING BOLTS

(75) Inventors: Robert Paul Czachor, Cincinnati, OH (US); Michael Leon Barron, Ten Mile, TN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/575,419

(22) Filed: May 20, 2000

(51) Int. Cl.[7] .............................................. F16B 33/00
(52) U.S. Cl. ................................... 403/337; 403/408.1
(58) Field of Search ............................. 403/337, 335, 403/408.1, 41, 24; 285/412; 411/531, 123; 415/214.1, 213.1, 209.3

(56) References Cited

U.S. PATENT DOCUMENTS

| | | | |
|---|---|---|---|
| 1,462,698 A | * 7/1923 | Haughey | 285/412 |
| 2,764,266 A | * 9/1956 | Haworth | 415/214.1 X |
| 3,323,842 A | * 6/1967 | Hanson | 411/531 X |
| 3,764,170 A | * 10/1973 | Brown | 285/412 |
| 4,131,050 A | 12/1978 | Holmes | 85/62 |
| 4,198,038 A | 4/1980 | Quinter | 269/137 |
| 4,205,927 A | 6/1980 | Simmons | 403/337 |
| 4,888,922 A | 12/1989 | Lancelot | 52/124.2 |
| 5,052,891 A | * 10/1991 | Burkholder | 416/198 A |
| 5,224,825 A | * 7/1993 | Strang et al. | 415/209.3 |
| 5,569,018 A | * 10/1996 | Mannava et al. | 415/200 |
| 5,727,927 A | 3/1998 | Luxenburger | 416/220 R |
| 6,176,663 B1 | * 1/2001 | Nguyen et al. | 411/368 |
| 6,238,131 B1 | * 5/2001 | Watts et al. | 403/337 |

* cited by examiner

Primary Examiner—Lynne H. Browne
Assistant Examiner—John R. Cottingham
(74) Attorney, Agent, or Firm—Nathan D. Herkamp; Alfred J. Mangels

(57) ABSTRACT

A flanged joint connection for connecting together by a bolted connection a pair of casing shells having connecting flanges. The connection reduces bearing stress concentrations adjacent fillets provided at the junction of the flange and the casing shell surface. A rectilinear edge portion is provided on a bolt head or a spacer, or both, to avoid point contact of the bolt head or spacer and the flange face or fillet. The rectilinear edge portion includes a convexly-curved surface that faces the fillet. The incidence of cracks between a bolt hole and the fillet, as well as the incidence of circumferential cracks between adjacent bolt holes is significantly reduced.

17 Claims, 5 Drawing Sheets

REDUCING CRACKING ADJACENT SHELL FLANGE CONNECTING BOLTS

BACKGROUND OF THE INVENTION

The present invention relates to bolted, flanged joints for joining together shell sections to provide a tubular casing. More particularly, the present invention relates to an article and a method for reducing the incidence of stress-induced cracking in aircraft gas turbine engine casing flange joints adjacent bolt holes in the abutting flanges.

Tubular casings are often assembled by bolting together flanges carried at edges of plates or shells that when connected at their respective flanges define the casing. Such tubular casings are utilized to surround and enclose the principal components of aircraft gas turbine engines, wherein relatively thin-walled shell sections are connected together at flanged joints to define the engine outer casing. Outwardly-extending flanges are provided at edges of the shell sections, and the sections are joined together at their respective abutting flanges by flange bolts that pass through a plurality of respective aligned bolt holes provided in the flanges.

Aircraft gas turbine engine outer casings include several shell sections that are joined together, and consequently they include a number of flanged casing joints. Each flanged joint contributes to the overall weight of the engine because of the double thickness of the flange material, the presence of fillet radii at the intersections of the flanges and the casing outer surface, and the several connecting bolts at each such flanged joint. And because the minimization of engine weight consistent with flight safety is a continual goal of aircraft engine designers, making the flanges thinner and reducing the radial length of the flanges can contribute to the reduction of engine weight.

There are, however, practical, material-strength-related limits to flange thickness reduction that need to be observed in order to maintain a strong flanged joint. And for a given flange material and a given flange thickness, reduction of the radial lengths of abutting flanges is limited by the bolt hole size, because flange material is necessary beyond the perimeter of the bolt holes to maintain the strength of the flanged joint. In that regard, attempted engine weight reduction by reducing the radial extent of the flange outer periphery by moving the flange bolt holes closer to the casing outer surface is limited. The size of the connecting bolt head, nut, and washer or spacer, if any, and also the size of the fillet radius at the junction of the flange and the outer casing surface serve to limit the innermost positions of the bolt hole centers. In that regard, when the bolt holes are close to the fillet radii the outer edges of the bolt heads and the outer edges of the nuts or washers bear against the flanges at points immediately adjacent the fillet radii, thereby causing stress concentrations at those points when the flanged joint is subjected to the normal loads to which an engine outer casing is subjected during engine and aircraft operation. Those loads are predominantly tensile loads and bending loads that can cause stress-induced surface cracks to appear at the radially innermost contact area between the bolt heads and washers and the adjacent shell structure, where such stress concentrations can occur. Any such surface cracks that are initiated can then propagate within the shell material, and dependent upon the bolt hole spacing, they might also propagate from one bolt hole to the next adjoining bolt hole, to adversely affect the structural integrity of the outer casing itself.

It is therefore desirable to provide a way to minimize the propensity for stress-induced cracking of portions- of a shell structure adjacent to end flanges that are connected with flanges of adjacent shell structures by a series of connecting bolts.

BRIEF SUMMARY OF THE INVENTION

Briefly stated, in accordance with one aspect of the present invention, a flanged joint connection is provided for securing together casing components to define a tubular casing having a longitudinal axis. The adjacent casing components each have respective abutting flanges with aligned openings extending through the flanges, and the flanges include a fillet at the junction of each flange and the outer surface of the respective casing component. The connection arrangement includes a bolt having a bolt head and an externally threaded bolt body that extends from the bolt head. The bolt head is in surface contact with an outwardly-facing, radially-extending surface of a first flange, and the bolt body extends through the aligned openings and outwardly beyond an outwardly-facing, radially-extending surface of a second flange that is in abutting relationship with the first flange. A nut is threadedly engaged with the threaded bolt body adjacent the outwardly-facing, radially extending surface of the second flange, and a spacer is positioned between and in surface contact with each of the nut and the outwardly-facing, radially-extending surface of the second flange. The spacer includes a substantially rectilinear edge portion positioned adjacent the flange fillet of the second flange and in substantially tangential relationship with an imaginary circle having its center coincident with the longitudinal axis of the tubular casing, for linearly distributing bearing surface stresses that result in the casing flange when the nut is tightened against the spacer.

In accordance with another aspect of the present invention, a method is provided for reducing stress-induced cracking in a bolted flange connection adjacent a bolt hole in a flange that extends outwardly from a tubular casing. The method includes providing a washer having a substantially rectilinear flat on its periphery, and orienting the washer so that the rectilinear flat is adjacent a fillet at the junction of a flange and an outer surface of the casing. The washer rectilinear flat is positioned so it is substantially tangent to an imaginary circle having its center lying on a longitudinal axis of the casing. The bolt is tightened to urge the washer against the flange for substantially line contact between the washer rectilinear flat and the flange.

BRIEF DESCRIPTION OF THE DRAWINGS

The structure, operation, and advantages of the present invention will become further apparent upon consideration of the following description, taken in conjunction with the accompanying drawings, in which.

DETAILED DESCRIPTION OF THE INVENTION

Figure 1:
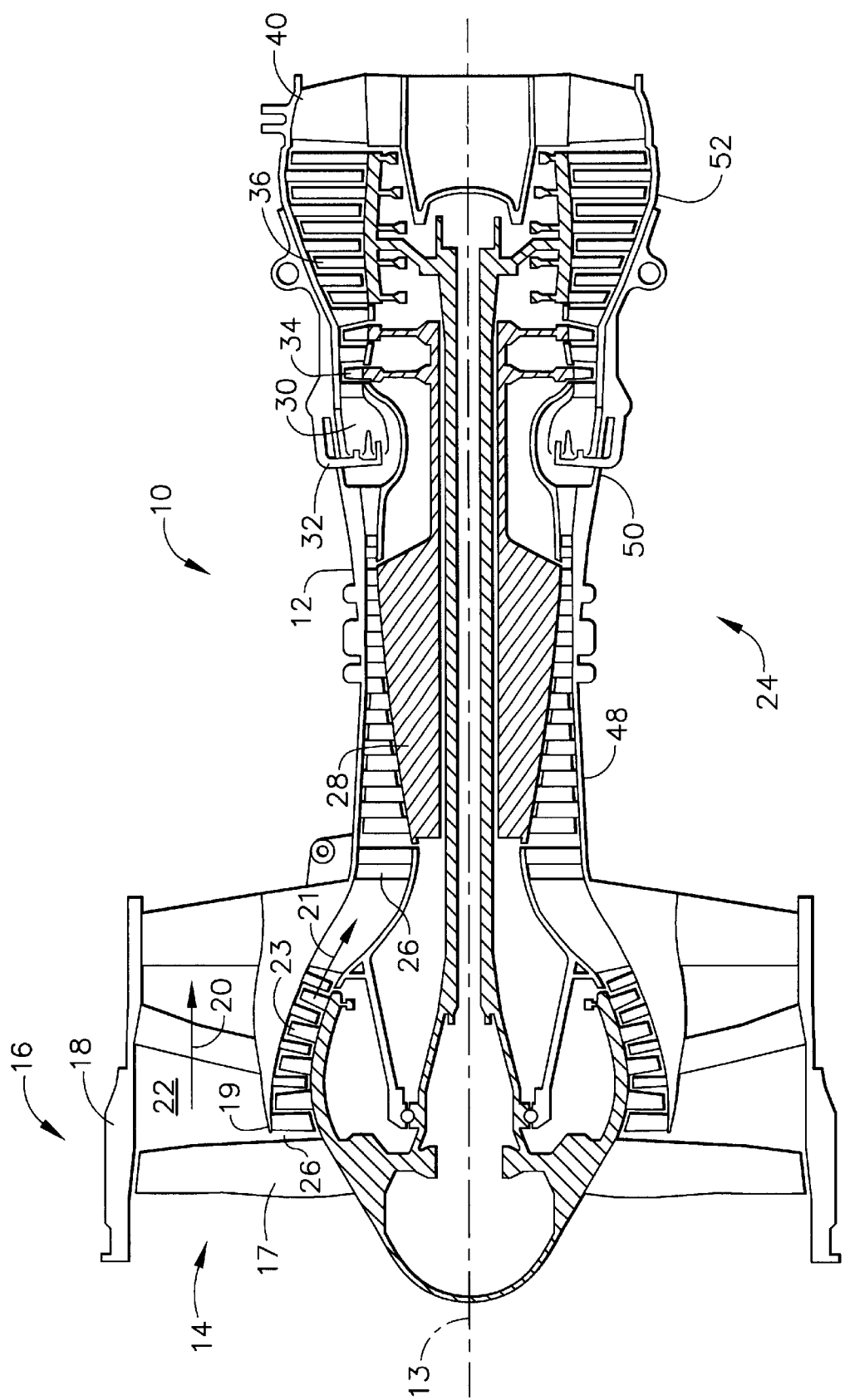
FIG. 1 is a longitudinal, cross-sectional view of an aircraft gas turbine engine including an outer casing defined by a plurality of shell sections having flanges that are bolted together.

Referring now to the drawings, and particularly to FIG. 1 thereof, there is shown a longitudinal cross-sectional view of an aircraft gas turbine engine 10 that is surrounded by an annular outer casing 12 that encloses the several components of the engine. Engine 10 has a longitudinal axis 13, about which the several rotating components of the engine rotate. An air inlet 14 is provided into which air is drawn to enter a fan section 16 within which the pressure and the velocity of the inlet air are increased. Fan section 16 includes a single-stage fan 17 that is enclosed by a fan casing 18. Fan outlet air that leaves fan 17 passes an annular divider 19 that divides the fan outlet air into a bypass airflow stream 20 and a core airflow stream 21. Bypass airflow stream 20 flows through an annular bypass duct 22, and core airflow stream 21 flows into a pressure booster section 23. From pressure booster section 23 core airflow stream 21 flows to a core engine 24 that includes an annular inlet 26.

Core engine 24 includes an axial-flow compressor 28 that is positioned downstream of inlet 26 and serves to further increase the pressure of the air that enters core engine 24. High-pressure air leaves compressor 28 and enters an annular combustion chamber 30 into which fuel is injected from a source of fuel (not shown) through respective circumferentially-spaced fuel nozzles 32 and is ignited to increase the temperature of, and thereby to add energy to, the pressurized air that leaves compressor 28. The high temperature combustion products pass from combustion chamber 30 to drive a first, high-pressure turbine 34 that is drivingly connected with and that rotates compressor 28, and then pass to a second, low-pressure turbine 36 that is drivingly connected with and that rotates fan 17 and pressure booster 23. The combustion products that leave low-pressure turbine 36 flow through an exhaust nozzle 40 to provide a portion of the propulsive thrust, while another portion of the total thrust of engine 10 is provided by bypass airflow stream 20.

Surrounding each of the sequentially-positioned major components of engine 10 that are identified above are respective annular casing sections. Thus, engine 10 includes fan casing 18 and core engine casing 12. Core engine 24 includes, in sequence, a compressor outer casing 48, a combustor outer casing 50, and a turbine outer casing 52.

The respective casing sections of engine 10 are generally defined by interconnected curved plates or annular shells that include circumferential and longitudinal end flanges to permit the respective adjoining curved plates and shells to be securely connected together.

Figure 2:
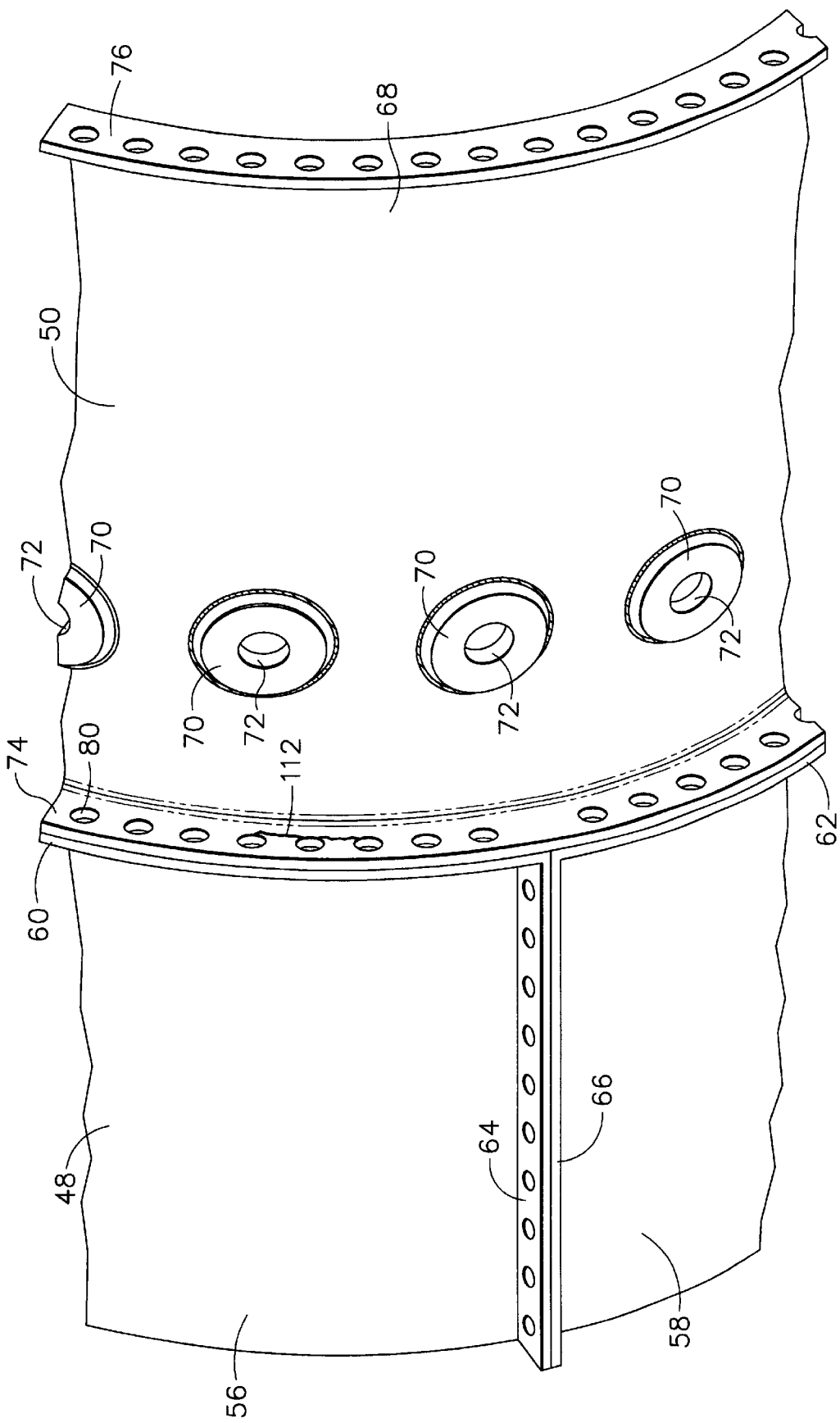
FIG. 2 is an enlarged, fragmentary perspective view showing flanged joint connections at a portion of the outer casing of the engine shown in FIG. 1

FIG. 2 shows a portion of compressor casing 48 and of combustor casing 50. Compressor casing 48 includes a pair of semi-cylindrical shells 56, 58 that include circumferential end flanges 60, 62 and longitudinal edge flanges 64, 66. Combustor casing 50 is shown as an annular structure in the form of a ring 68, but it can instead be provided in the form of a pair of semi-cylindrical shells, if desired. Casing 50 includes a plurality of circumferentially-spaced bosses 70 having throughbores 72 for receiving respective fuel injection nozzles (not shown). End flanges 60 and 62 and edge flanges 64 and 66 of compressor casing 48, and also end flanges 74 and 76 of combustor casing 50 each include a plurality of equally-spaced, circumferentially-disposed throughbores 78 and 80 (only throughbores 80 are visible in FIG. 2), respectively, for receiving connecting bolts (not shown) for securely connecting together casings 48 and 50.

Figure 3:
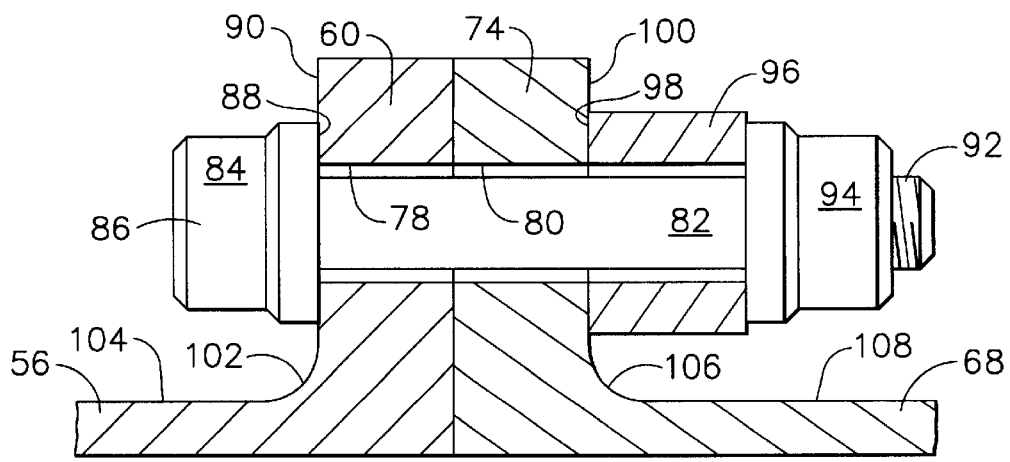
FIG. 3 is an enlarged, fragmentary, cross-sectional view of a prior art flanged joint connection.

A conventional, prior art bolted flange connection is shown in FIG. 3, which is an enlarged, cross-sectional view of the flanged connection between compressor casing 48 and combustor casing 50. Casing wall 56 includes outwardly-extending radial flange 60, which defines what is sometimes referred to as a lever flange. Flange 60 includes a throughbore 78 for receiving the threaded body 82 of a connecting bolt 84, which includes a bolt head 86 having an annular bearing face 88 that is in tight contacting engagement with flange outer surface 90 when bolt 84 is tightened. Similarly, adjacent casing wall 68 includes outwardly-extending radial flange 74 that has throughbore 80 for receiving body 82 of bolt 84. Outer end 92 of bolt 84 carries nut 94 and annular spacer 96 so that when bolt 84 and nut 94 are tightened annular end surface 98 of spacer 96 is in tight, contacting relationship with flange outer surface 100 of flange 74. A concavely-curved fillet 102 extends between outer surface 90 of flange 60 and the adjacent outer surface 104 of casing 56, and a similar concavely-curved fillet 106 extends between outer surface 100 of flange 74 and the adjacent outer surface 108 of casing 68.

As shown in FIG. 3, the bolt hole defined by aligned throughbores 78 and 80 has its longitudinal axis spaced from casing outer surfaces 104 and 108 a distance sufficient to allow the radially lowermost edges of each of annular bearings faces 88 and 98 to lie on a planar flat portion of the respective flange surfaces and spaced from fillets 102 and 106. Accordingly, the bearing stresses imposed on the respective flange faces 90 and 100 are initially substantially uniformly distributed.

Figure 4:
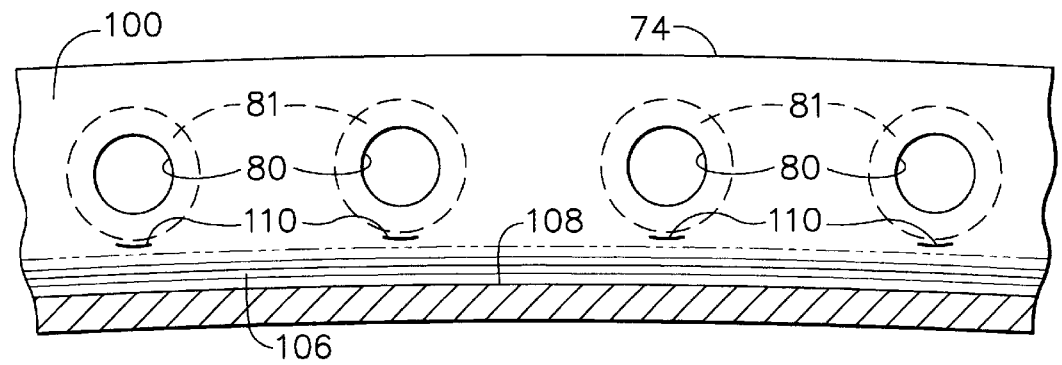
FIG. 4 is a fragmentary view of a portion of a flange showing one form of stress-induced cracking of an engine casing flange.
Figure 5:
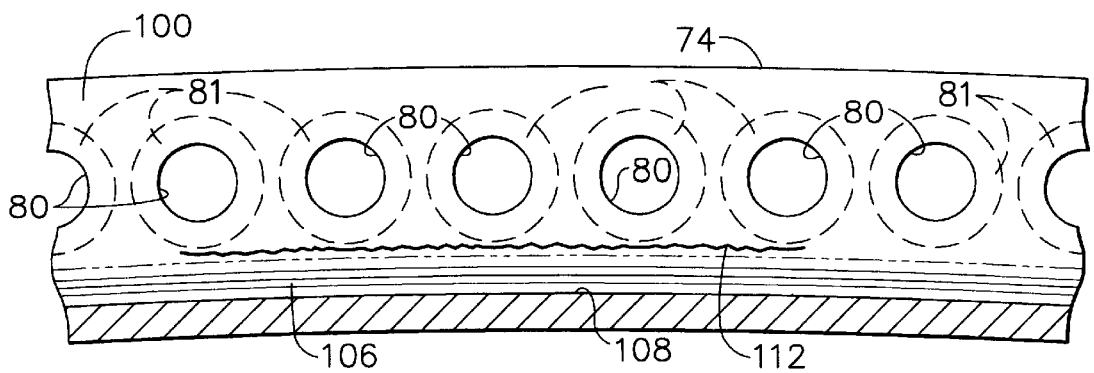
FIG. 5 a fragmentary view similar to that of FIG. 4 and showing another form induced cracking of an engine casing flange.

When the engine is installed in an aircraft and the aircraft is performing normal maneuvers within its flight operating envelope the engine casing is subjected to various types of loads. Each of the casings is first a pressure-containing shell, but it is also subjected to axial tensile stresses, to thermally-induced stresses, to torsional stresses, and to bending stresses, among others. Because of those several stresses, and because of their generally cyclical nature over time, cracks can appear at the casing joints. Examples of the locations of such cracks are shown in FIGS. 4 and 5. FIG. 4 shows circumferential cracks 110 that can appear in flange 74 adjacent the radially innermost edge, relative to the engine longitudinal axis, of a bearing surface 81 against which a bolt head or a spacer bears when a connecting bolt (not shown) is tightened against flange face 100. Cracks 110 occur adjacent fillet 106 that is provided at the intersection of flange face 100 and casing outer surface 108. If the loading on the flanges is maintained for a sufficiently long period of time, or if the loads increase for some reason, the initial circumferential cracks shown in FIG. 4 can propagate circumferentially and ultimately join together to form a substantially continuous crack 112 as shown in FIG. 5. Crack 112 extends substantially parallel to fillet 106 and is immediately adjacent the radially innermost edges of respective bearing surfaces 81, and it substantially diminishes the integrity of the casing at the area within which such extensive cracking occurs. Without intending to be limited to only one possible explanation, it is theorized that a likely cause of such circumferential cracks is the combined stresses adjacent the flange fillet at a point beneath the radially innermost edges, relative to the casing longitudinal axis, of the bearing surface of an overlying bolt head face or an overlying spacer face.

One way to reduce the weight of material that is included in engine casing flanges is to shift the centerline of the connecting-bolt hole radially inwardly, closer to the casing surfaces, to allow the radius of the flange periphery to be reduced. Doing so, however, increases the tendency for the radially innermost edges of the bolt head and of the spacer, relative to the casing longitudinal axis, coming into contact with the surface of the adjacent fillet. And that contact is essentially point contact, which results in a stress concentration that leads to higher stresses at that point, thereby leading to possible flange cracks over time.

Figure 6:
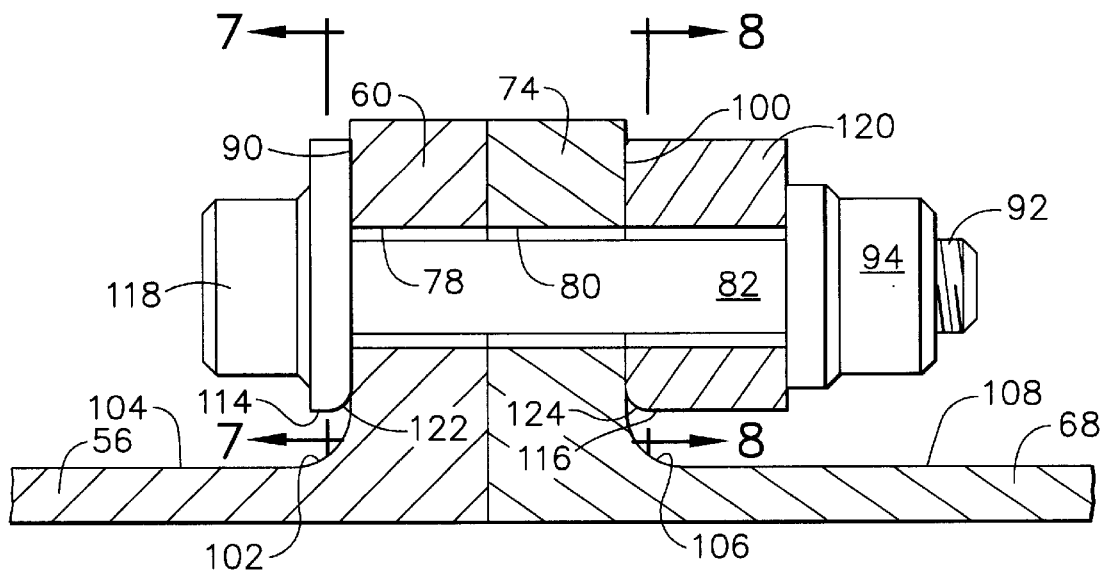
FIG. 6 is an enlarged, fragmentary, cross-sectional view similar to that of FIG. 3 but showing a flanged joint connection that is an embodiment of the present invention.
Figure 7:
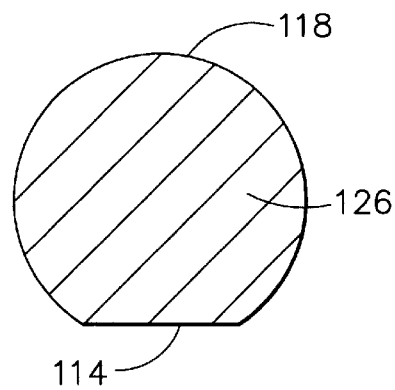
FIG. 7 is a cross-sectional view taken along the line 7—7 of FIG. 6.
Figure 8:
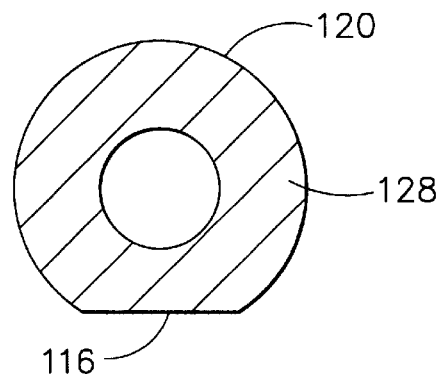
FIG. 8 is a cross-sectional view taken along the line 8—8 of FIG. 6.

To reduce the likelihood of such flange cracking, a bolted connection having the connecting bolt elements configured as shown in FIGS. 6 through 8 provides substantially line contact adjacent the flange fillet. As shown in those figures, each of bolt head 118 and spacer 120 includes a rectilinear edge 114, 116, respectively, along their periphery, and the respective rectilinear edges are so oriented that they lie adjacent to fillets 102 and 106. Preferably, rectilinear edges 114, 116 are so disposed relative to their respective casing outer surfaces that they are substantially tangent to respective imaginary circles having their centers coincident with the casing longitudinal axis.

In addition to having respective rectilinear edges, bolt head 118 and spacer 120 also have respective convexly-curved ends 122, 124 that extend from the flange-contacting faces 126, 128 thereof to rectilinear edges 114, 116, respectively. The convexly-curved ends aid in avoiding point-contact-related stress concentrations by spreading any contact forces linearly along the flange faces, thereby reducing the concentration of stress. In that regard, convexly-curved ends 122 and 124 can be defined by circular arcs that can have a radius of curvature that ranges from about 1.27 mm. to about 7.62 mm., preferably from about 2.54 mm. to about 3.05 mm. Most preferably the radii of curvature of convexly-curved edges 122 and 124 are substantially equal to the radii of the adjacent flange fillets so that any contact therebetween is contact over an area, rather than rectilinear contact, which tends even further to reduce the stress concentration.

Figure 9:
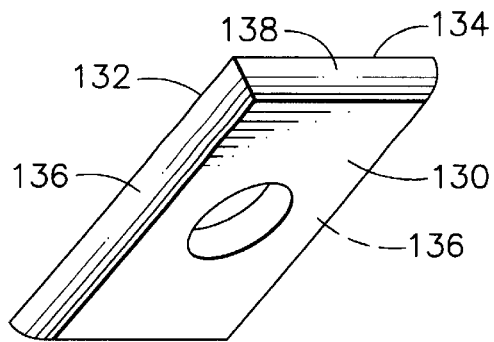
FIG. 9 is an enlarged, perspective view of one form of washer that embodies he present invention.
Figure 10:
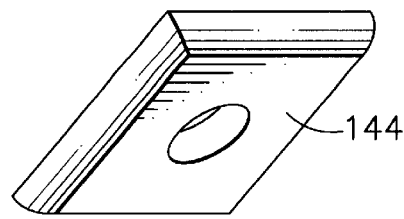
FIG. 10 is an enlarged, perspective view of another form of washer that embodies the present invention.

The provision of the rectilinear edges and adjacent curved ends can be implemented on different elements of a connecting bolt assembly, as shown in FIGS. 9 through 13. Thus, a rectangular spacer 130 can be provided having opposed pairs of rectilinear edges 132, 134 and corresponding curved ends 136, 138 as shown in FIG. 9. When rectilinear edges 132 and 134 are equal in length, as shown in FIG. 10, to provide a square spacer 144, the spacer can be oriented so that any one of the four rectilinear edges is disposed adjacent the flange fillet.

Figure 11:
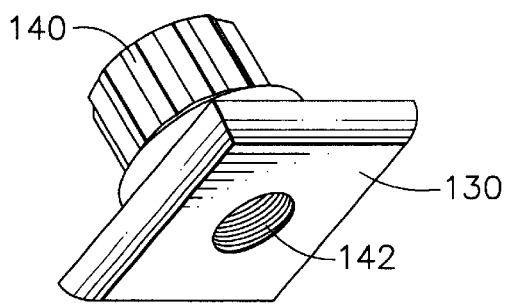
FIG. 11 is an enlarged, perspective view of a nut and integral washer that embodies the present invention.

FIG. 11 shows an embodiment including a spacer having the structure illustrated in FIG. 9 that is integral with connecting nut 140. The spacer has an internal thread 142 that has the same diameter and pitch as that of the internal thread carried by the nut. Alternatively, the spacer can be provided as a separate element that is suitably rigidly secured, such as by welding, or the like, to the bearing surface of nut 140.

Figure 12:
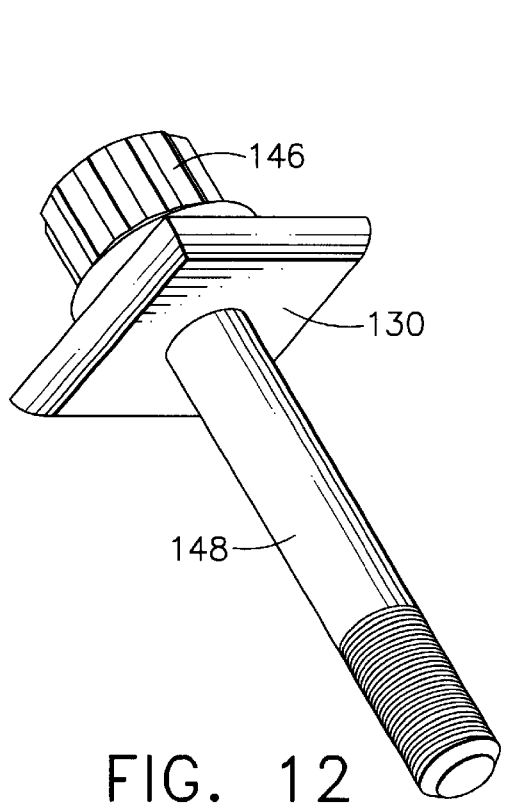
FIG. 12 is an enlarged, perspective view of a bolt and integral washer that embodies the present invention.

FIG. 12 shows an embodiment in which a spacer 130 having the structure illustrated in FIG. 9 is integral with a bolt head 146 of a connecting bolt 148. Alternatively, spacer 130 can be provided as a separate element that is suitably rigidly secured, such as by welding, or the like, to the bearing surface of bolt head 146.

Figure 13:
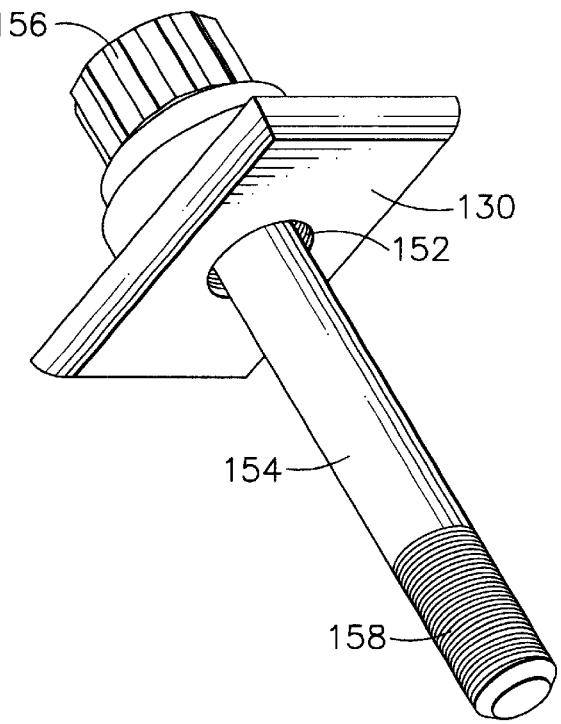
FIG. 13 is an enlarged, perspective view of another form of bolt and washer that embodies the present invention.

FIG. 13 shows an embodiment including a spacer 130 having the structure illustrated in FIG. 9 and including a threaded throughbore 152 that is loosely carried on an unthreaded shank portion 154 of a bolt 156. Threaded throughbore 152 has the same thread pitch and thread diameter as that of bolt thread 158 so it can be threadedly received by bolt 156 and loosely retained on shank portion 154, to simplify maintenance operations involving connection or separation of the flanges because the spacer is carried by the bolt.

As will be appreciated by those skilled in the art, although reference has been made herein to curved shell sections, and although curved shell sections having curvilinear flanges have been illustrated and described, the present invention is also applicable to flanged joints defined by rectilinear flanges that are carried by substantially flat plates. Additionally, the present invention is also applicable to curved plates having rectilinear flanges, such as compressor casing shells 56 and 58 shown in FIG. 2.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A flanged joint connection comprising:
   a. a pair of first and second abutting end flanges carried by respective ones of a pair of flanged casing sections, the flanges each having a plurality of spaced, aligned openings extending therethrough and a fillet at a junction of the flange and an adjacent surface of the casing section;
   b. a bolt having a bolt head and an externally threaded bolt body extending from the bolt head, wherein the bolt head is in surface contact with a first flange surface that extends transversely relative to a casing surface of a first casing component and wherein the bolt body extends through the aligned openings and outwardly beyond a flange surface that extends transversely relative to a casing surface of a second casing component;
   c. a nut threadedly engaged with the threaded bolt body adjacent the transversely-extending flange surface of the second flange; and
   d. a spacer positioned between and in surface contact with each of the nut and the transversely-extending flange surface of the second flange, the spacer having an opening therethrough for receiving the bolt body and including a substantially rectilinear outer edge portion positioned adjacent the flange fillet of the second flange and in substantially tangential relationship with an imaginary circle having its center coincident with the longitudinal axis of the casing sections, for rectilinearly distributing over a greater part of the second flange stresses that are induced in the casing second flange when the nut is tightened against the spacer.

2. A flanged joint connection in accordance with claim 1, wherein the rectilinear edge portion of the spacer includes a convexly-curved edge surface adjacent to and facing the fillet of the second flange.

3. A flanged joint connection in accordance with claim 2, wherein the spacer is in the form of an annular disk.

4. A flanged joint connection in accordance with claim 2, wherein the edge surface is of substantially circular form.

5. A flanged joint connection in accordance with claim 1, wherein the spacer is of substantially rectangular conformation.

6. A flanged joint connection in accordance with claim 5, wherein the spacer is of square conformation.

7. A flanged joint connection in accordance with claim 1, wherein the bolt head includes a substantially rectilinear edge portion positioned adjacent the flange fillet of the first flange and in substantially tangential relationship with an imaginary circle having its center coincident with the longitudinal axis of the tubular casing.

8. A flanged joint connection in accordance with claim 7, wherein the rectilinear edge portion of the bolt head includes a convexly-curved edge surface adjacent to and facing the fillet of the first flange.

9. A flanged joint connection in accordance with claim 1, including a second spacer positioned between and in surface contact with the bolt head and the outwardly-facing, radially-extending surface of the first flange, the second spacer including a substantially rectilinear edge portion positioned adjacent the flange fillet of the first flange and in substantially tangential relationship with an imaginary circle having its center coincident with the longitudinal axis of the tubular casing for distributing over a greater part of the outer radial surface of first flange stresses that are induced in the casing first flange when the bolt and nut are tightened against the respective spacers.

10. A flanged joint connection in accordance with claim 9, wherein the rectilinear edge portion of the second spacer includes a convexly-curved surface adjacent to and facing the fillet of the first flange.

11. A flanged joint connection in accordance with claim 9, wherein the bolt body thread commences at an axial position along the bolt body that is spaced from the bolt head, and the second spacer includes an opening having an internal thread that is engageable with the external thread of the bolt body for retaining the second spacer on the bolt body at a position between the bolt head and the bolt body thread commencement position.

12. A flanged joint connection in accordance with claim 2, wherein the convexly-curved edge surface is defined by a circular arc that has a radius of from about 2.54 mm to about 7.62 mm.

13. A flanged joint connection in accordance with claim 2, wherein the fillet of the second flange has a concavely-curved outer surface and the spacer curved edge surface has a curvature that corresponds substantially with the curvature of the concavely-curved outer fillet surface at the second flange.

14. A flanged joint connection in accordance with claim 8, wherein the convexly-curved edge surface is defined by at least one circular arc.

15. A flanged joint connection in accordance with claim 8, wherein the convexly-curved edge surface is defined by a circular arc that has a radius of from about 2.54 mm to-about 7.62 mm.

16. A flanged joint connection in accordance with claim 9, wherein the fillet at the first flange has a concavely-curved outer surface and the curved edge surface of the second spacer has a curvature that corresponds substantially with the curvature of the concavely-curved outer surface of the fillet at the first flange.

17. A method for reducing stress-induced cracking adjacent a connecting bolt in a bolted flange connection adjacent a bolt hole in a flange extending transversely from the outer surface of a tubular casing, said method comprising:
   a. providing a spacer having a substantially rectilinear peripheral edge portion;
   b. orienting the spacer so the rectilinear edge portion is adjacent a fillet at a junction of a flange and an outer surface of the tubular casing;
   c. positioning the spacer rectilinear edge portion so it is substantially tangent to an imaginary circle having its center lying on a longitudinally-extending axis within the casing; and
   d. tightening a bolt that passes through the spacer to urge the spacer against a flange radial surface to distribute over a greater portion of the flange surface bearing stresses that are induced in the flange surface as a result of tightening the bolt so that the spacer bears against the flange radial surface.

\* \* \* \* \*